May 19, 1964
J. LONG
3,134,004
PLUNGER OPERATED BRAKE TYPE SWITCH
Filed Feb. 15, 1962
3 Sheets-Sheet 1
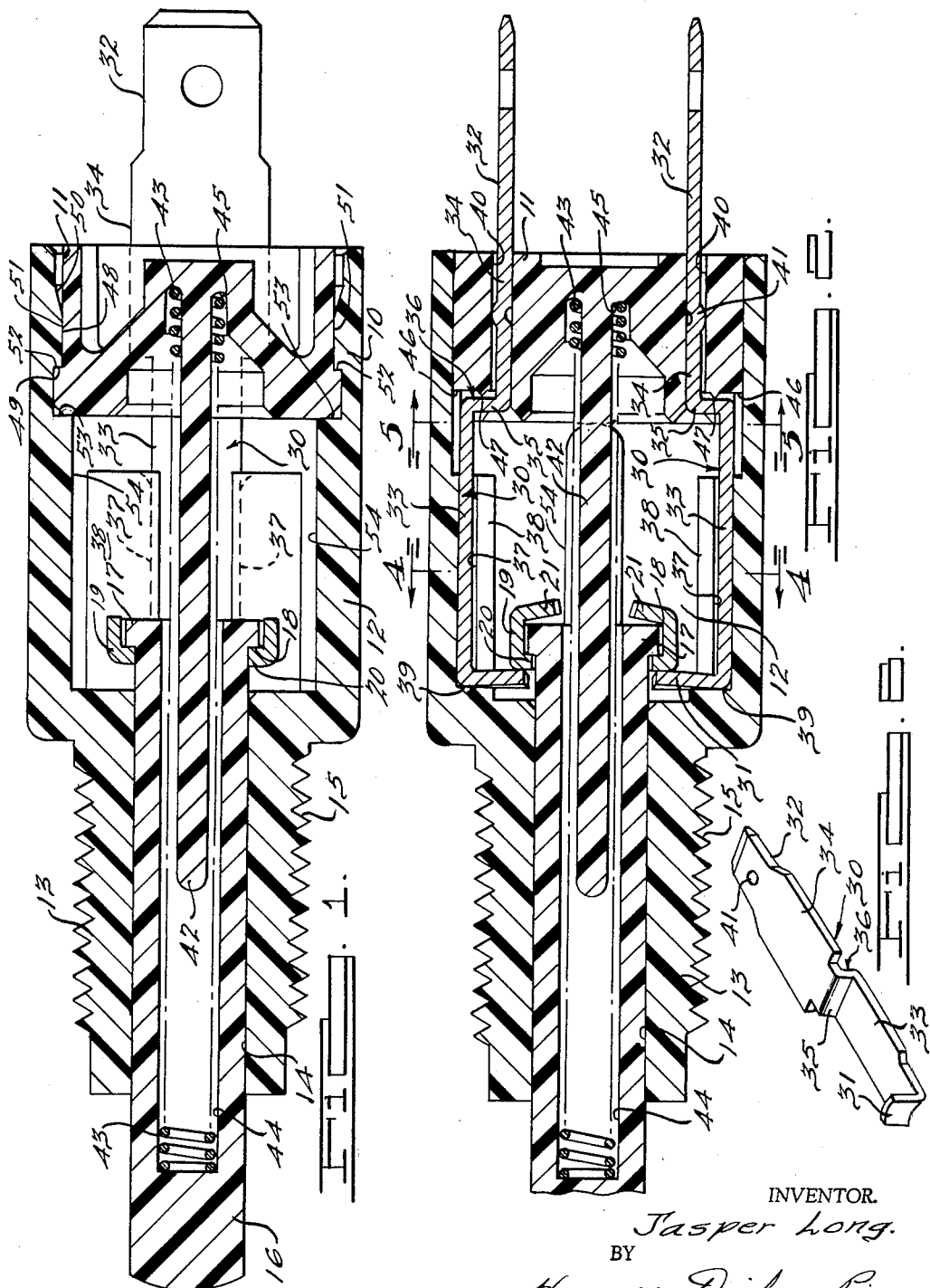
INVENTOR.
Jasper Long.
BY
Harness, Dickey & Pierce
ATTORNEYS.

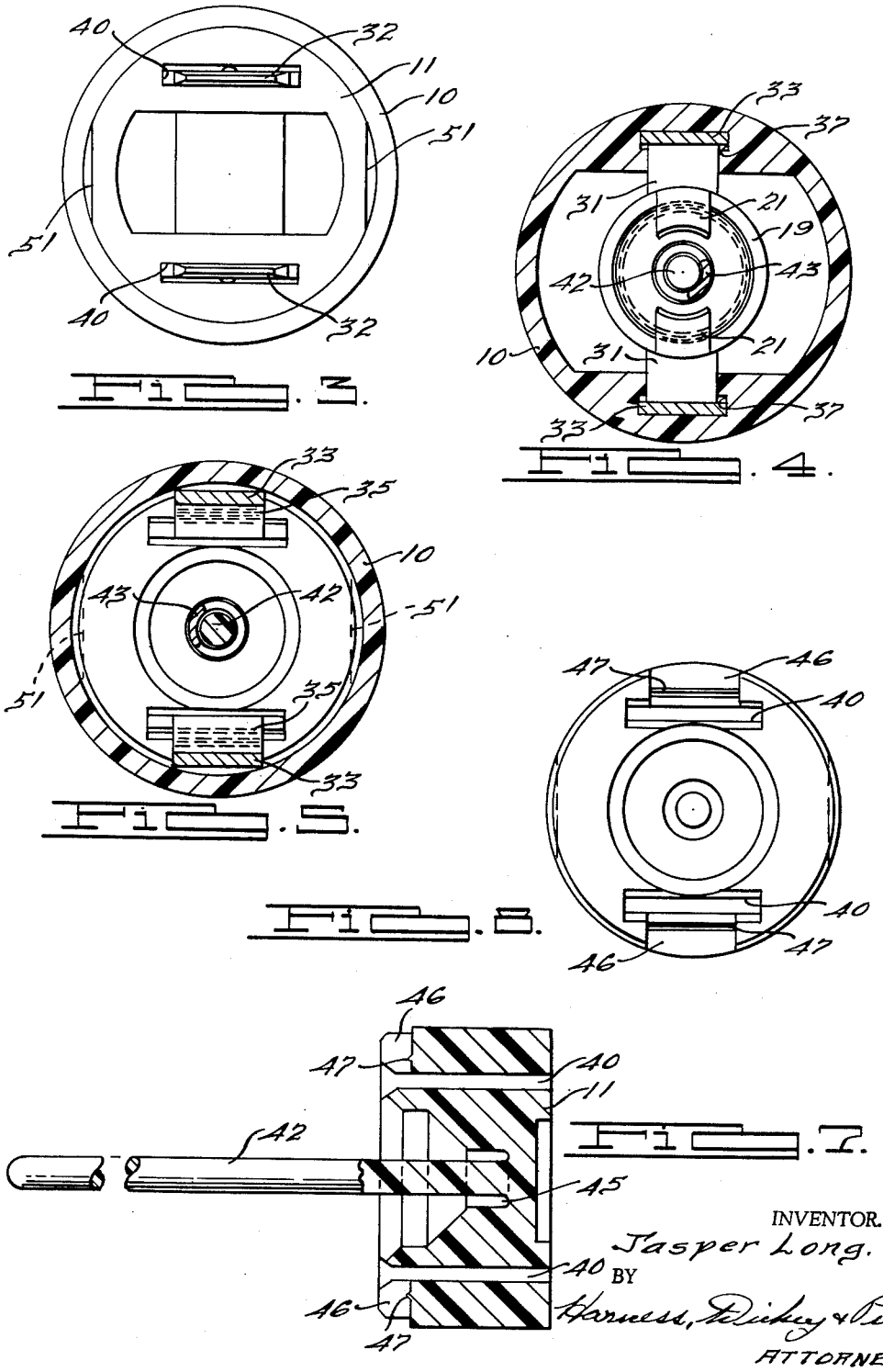

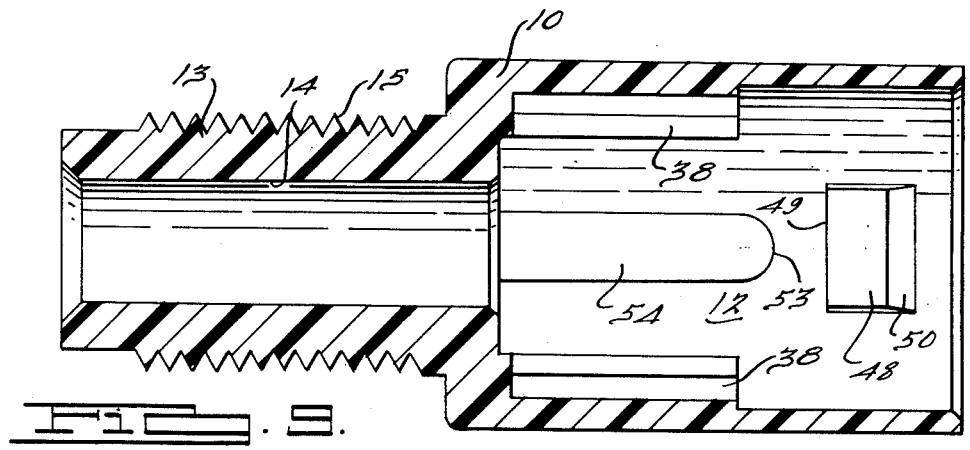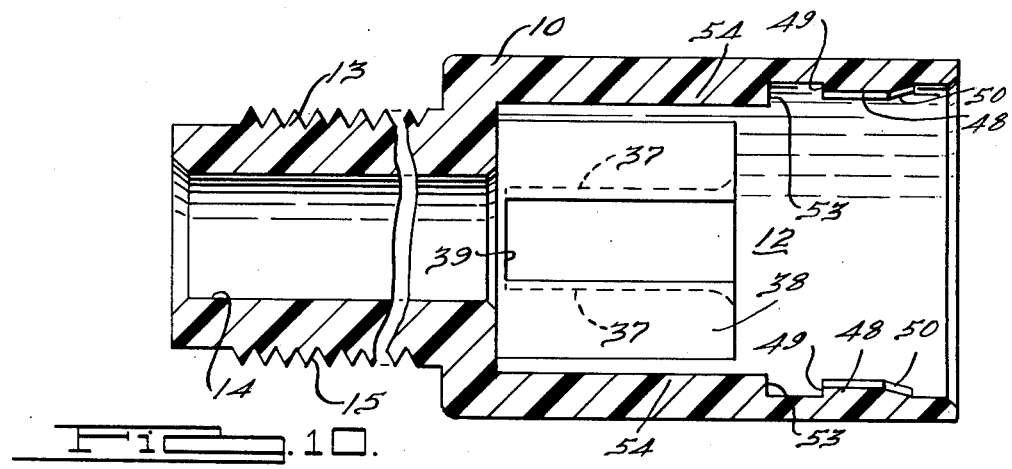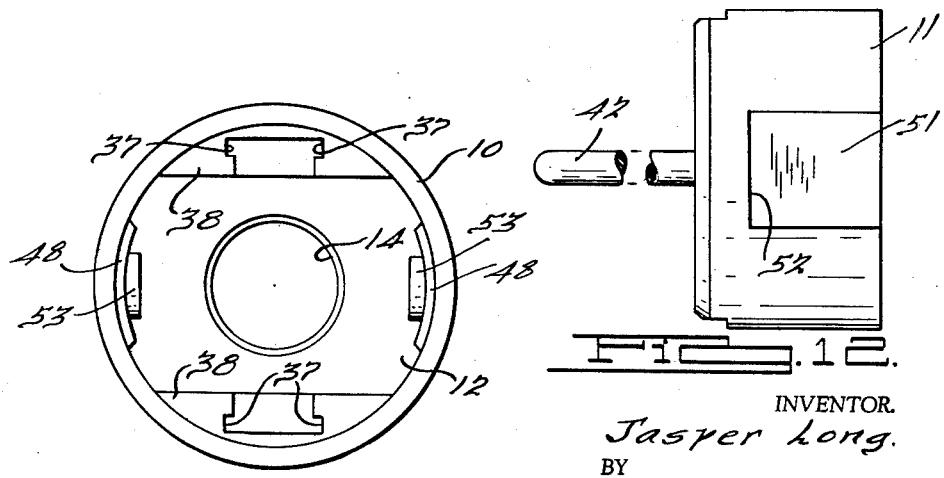

United States Patent Office 3,134,004
Patented May 19, 1964

3,134,004
PLUNGER OPERATED BRAKE TYPE SWITCH
Jasper Long, Sturgis, Mich., assignor to Wade Electric Products Co., Sturgis, Mich., a corporation of Michigan
Filed Feb. 15, 1962, Ser. No. 173,536
7 Claims. (Cl. 200—159)

This invention relates to electrical switches and more particularly to a plunger-type switch.

While the switch of this invention may be employed in various environments, it finds particular utility when used in connection with the foot or service brake of an automobile to close a circuit to a stop light or signal light to indicate that the brakes have been applied.

It is an object of this invention to provide a switch of this type which comprises a minimum number of parts capable of production by simple molding operations and which may be assembled with the facility required for the mass production employed in the manufacture of automobile parts.

The invention accomplishes the foregoing and other objects by means of a construction wherein the various parts can be manufactured quickly and easily in large quantities with simple tooling. In order to adapt the component parts of the switch to simple tooling and facile assembling, special structural features are incorporated, which features will become apparent as this description proceeds, especially when considered in connection with the accompanying drawings in which:

FIG. 1 is a longitudinal sectional view through a switch constructed in accordance with the invention, FIG. 2 is a longitudinal sectional view taken along a plane located 90° from the sectional view shown in FIG. 1, FIG. 3 is an end elevation of the switch as seen from the right in FIG. 2, FIG. 4 is a transverse sectional view taken substantially on the plane indicated by line 4—4 in FIG. 2, looking in the direction of the arrows.

FIG. 5 is a transverse sectional view taken substantially on the plane indicated by line 5—5 in FIG. 2, looking in the direction of the arrows.

FIG. 6 is a perspective view of one of the terminal members used in the switch assembly, FIG. 7 is an enlarged detail longitudinal sectional view of one of the housing parts, FIG. 8 is an end view of this housing part as viewed from the left-hand end of FIG. 7, FIG. 9 is an enlarged detail longitudinal sectional view of the outer housing part, FIG. 10 is a view similar to FIG. 9 taken on a plane located 90° from the sectional view shown in FIG. 9, FIG. 11 is an end elevational view of the part shown in FIG. 9 as viewed from the right-hand end thereof, and FIG. 12 is an enlarged elevational view of the inner housing part.

Referring now to the drawings, one commercially practical embodiment of this invention will be described in detail. As shown in FIGS. 1, 2, 7 and 9, the switch comprises two housing parts 10 and 11. The housing part 10 is sometimes hereinafter referred to as the front or outer housing part, and the housing part 11 is sometimes hereinafter referred to as the back or inner housing part. These housing parts 10 and 11 may advantageously be formed of a resilient thermoplastic material such as the material sold under the trade name "Delrin," which is a highly stable crystalline form of polymerized formaldehyde. Obviously, however, other types of plastic materials may be employed. Parts 10 and 11 are so designed that they can be manufactured by molding operations by the use of simple molds; that is, molds having only axially-extending core portions to form the various internal shoulders and grooves. Thus, the design is of such a nature as to take advantage of the characteristics of resilient thermoplastic materials thus enabling the parts to be mass produced inexpensively and with a minimum of initial tooling expense.

The housing part 10 is shown as being cylindrical in cross section and has a hollow interior or chamber 12 to contain the switch parts. The housing part 10 has an opening at one end, which opening is closed by the housing part 11 secured thereto in a manner yet to be described. The opposite end of the housing part 10 is provided with an integral extension or nipple portion 13 which is provided with a passageway or bore 14 and an exteriorly threaded portion 15. The threaded portion 15 is adapted to engage a threaded opening in a support (not shown) upon which the switch is mounted.

Slidably mounted in the passageway or bore 14 is a plunger 16 one end of which extends beyond the nipple 13 while the other or inner end is located in the chamber 12. The plunger 16 is preferably molded from a phenolic resin or some other similar material having high heat resisting properties. The inner end of the plunger 16 is provided with a circular head 17 forming an annular shoulder 18. Secured to the head 17 is a metal ring-like contact member 19 having an inturned flange 20 adapted to engage the shoulder 18 and a pair of ears 21 adapted to be bent inwardly toward one another to loosely secure the contact member 19 to the plunger 16. Thus, the contact member 19 may rotate freely and adjust itself independently of the plunger.

The reference character 30 indicates a pair of metal terminals, the inside or contact ends 31 of which are separated and adapted to be bridged by the contact member 19 when the plunger 16 is in the position shown in FIG. 2. As shown in FIGS. 2 and 6, these contact ends 31 are curved or dished to provide some rigidity thereto. The opposite ends 32 of the terminal members extend outside of the housing and are adapted to be connected to a complementary socket member included in the circuit to be controlled.

As shown in FIGS. 1, 2 and 6, each terminal member 30 is provided with a portion 33 of reduced width and a wider portion 34. The portions 33 and 34 are offset from one another by a right angularly-extending portion 35 forming a shoulder 36. The offset portion 35 is the same width as the narrow portion 33 of the terminals.

Each terminal member 30 is secured to the housing member 10 by engaging the narrow portion 33 with laterally spaced undercut grooves 37 formed in a boss or thickened portion 38 on the inner wall of the housing 10. Each terminal member is slid endwise in the grooves 37 until the terminal contact end 31 engages a shoulder 39 at the end of the grooves 37.

The other housing member 11 is in the shape of a plug adapted to close the open end of the housing member 10. The housing member 11 is provided with a pair of spaced, longitudinally-extending slots 40 through which the wider portions 34 of the terminals 30 extend. The portions of the terminal members which pass through the slots 40 are preferably provided with raised portions or detents 41 to provide a friction fit between the terminal members 30 and housing member 11 during the assembly operation.

Formed integrally with the housing part 11 and extending axially therefrom is a spring guide 42, see FIGS. 1, 2 and 7. Around the spring guide 42 is a spring 43, one end of which is seated in the closed end of a bore 44 formed in the plunger 16 while the other end of the spring 43 seats in a seating recess 45 in the housing member 11. This spring tends to maintain the plunger 16 in the position shown in FIGS. 1 and 2 in which the contact member 19 bridges the contact ends 31 of the terminals 30 to close the circuit.

Extending laterally from the slots 40 to the periphery of the body member 11 are radial slots 46, see FIGS. 2, 7 and 8. These slots snugly receive the offset portions 35 of the terminal members 30. Formed on the bottom surface of each slot 46 is a rib 47 adapted to engage the shoulder 36 of the offset portion 35 as shown in FIG. 2, when the body portion 11 is assembled with the body portion 10.

Means are provided for quickly, easily and firmly securing the housing part 11 to the housing part 10. This means consist of circumferentially-extending opposed ribs 48 formed on the inner surface of the body part 10. The axially inner surfaces of these ribs 48 from right angularly-extending shoulders 49 while the opposite sides of the ribs are tapered or inclined as indicated at 50 (see FIGS. 9 and 10). The housing member 11 is provided with two opposed flattened portions 51 forming shoulders 52 which engage behind the shoulders 49 when the housing member 11 is inserted into the open end of the housing member 10. When the housing member 11 is inserted into the housing member 10, the end of the housing 11 will engage the inclined or tapered surfaces 50 to slightly expand the housing 10 due to its inherent resiliency, to permit the shoulders 52 to pass over the ribs 48 so that the shoulders 52 may snap in place behind the shoulders 49. Inward movement of the housing member 11 is arrested by its engagement with the ends 53 of ribs 54 formed on the wall of the housing member 10.

When the housing part 11 is secured in place, as above described, the ribs 47 engage the shoulders 36 of the offset portions 35 of the terminal members to hold the inner ends of these terminal members against the shoulders 39 at the ends of the undercut slots 37. The undercut slots 37 firmly hold the terminal members 30 against lateral or radial inward displacement and the slots 46 and ribs 47 on the housing member 11 secure the terminal members against endwise movement. Thus, the terminal members are firmly held in proper position within the chamber 12 of the switch.

The functioning of the switch is believed to be obvious. If it is used in connection with the foot or service brake of an automobile to control the circuit to the stop light, it will be disposed in such a position by means of the threaded nipple 13, that when the brake pedal is released, it will depress the plunger 16 to separate the contact 19 from the terminal contacts 31, thus breaking the circuit to the stop light. When the brake pedal is depressed, it will release the plunger 16 whereupon the spring 43 will move the plunger 16 to the position shown in FIG. 2 to close the circuit to the stop light.

It is believed that the manner of assembling the switch will be obvious. The terminal members 30 are first engaged with the undercut slots 37 with the inner contact ends 31 thereof engaging the shoulders 39. Thereupon, the plunger 16 is inserted from the open end of the housing 10. The spring 43 may either be first inserted to the bore 44 or threaded onto the spring guide 42 of the housing part 11. Thereupon, the housing part 11 is slipped over the ends 32 of the terminal members 30 and snapped into place by engagement of the shoulders 52 with the shoulders 49 of ribs 48; the inner end of the housing mem- This locks the housing parts together and the engagement of the ribs 47 with the shoulder portions 36 of the terminal the ribs 47 with the shoulder portions 36 of the terminal members holds the terminal members against endwise displacement. Obviously, the spring 43 is compressed when the housing parts are assembled so as to normally bias the plunger 16 in an outward direction, whereupon the contact member 19 bridges the terminal contact 31 to close the circuit.

While one practical and commercially acceptable form of the invention has been described and illustrated herein in detail, it will be understood that various changes may be made as may come within the purview of the accompanying claims.

What is claimed is:

1. A switch comprising an outer housing part forming a chamber having an open end, an inner housing part fitting within the open end of said outer housing part to close the same, a terminal member in said chamber slidably connected to said outer housing part, said slidable connection comprising opposed grooves in the wall of said chamber to slidably receive the edges of said terminal member, interengaging means on said inner housing part and terminal operable to hold said terminal member in place, and means for securing said housing parts in assembled relation.

2. A switch comprising an outer housing part forming a chamber having an open end, an inner housing part fitting within the open end of said outer housing part to close the same, a terminal member in said chamber slidably connected to said outer housing part, said slidable connection comprising a pair of spaced, opposed undercut grooves formed on the inner wall of the chamber of the outer housing part, and a shoulder at the inner ends of said grooves, said terminal member being inserted through the open end of said chamber and slidably engaged in said grooves until the inner end thereof engages said shoulder, interengaging means on said inner housing part and terminal operable to hold said terminal member in place, and means for securing said housing parts in assembled relation.

3. A switch comprising an outer housing part forming a chamber having an open end, an inner housing part fitting within the open end of said outer housing part to close the same, a terminal member in said chamber slidably connected to said outer housing part, said terminal member being formed with an angularly-extending offset portion intermediate its length forming a shoulder, said inner housing part being provided with a radial slot to receive said offset portion with a portion of the bottom of said slot engaging said shoulder and operable to hold said terminal member in place, interengaging means on said inner housing part and terminal operable to hold said terminal member in place, and means for securing said housing parts in assembled relation.

4. A switch as described in claim 3 in which the shoulder engaging means is a rib formed in the bottom of said slot.

5. A switch comprising an outer housing part forming a chamber having an open end, an inner housing part fitting within the open end of said outer housing part to close the same, a pair of terminal members in said chamber, interengaging means on said housing parts and terminal members operable to hold said terminal members in place, a plunger slidably mounted in said outer housing part with its inner end extending into said chamber, a head portion formed on the inner end of said plunger forming a shoulder, and a metal ring-like contact member having an inturned flange engaging said shoulder and at least one ear bent inwardly with respect to said head to loosely secure said contact member to said head so as to permit said contact member to rotate freely and adjust itself independently of said plunger.

6. A switch comprising an outer housing part forming a chamber having an open end, an inner housing part fitting within the open end of said outer housing part to close the same, a terminal member in said chamber, a pair of spaced opposed grooves formed on the inner wall of the outer housing part for slidably receiving said terminal member, the inner end of said terminal member being bent to form a contact surface, a shoulder in said chamber at the end of said grooves engaged by the bent end of said terminal member to limit movement of said terminal member in one direction, interengaging means on said inner housing part and terminal member operable to hold said terminal member against movement in the other direction, and means for securing said housing parts in assembled relation.

7. A switch comprising an outer housing part forming a chamber having an open end, an inner housing part fitting within the open end of said outer housing part to close the same, a terminal member in said chamber, a pair of spaced opposed undercut grooves formed on the inner wall of the outer housing part for slidably receiving said terminal member, the inner end of said terminal member being bent at an angle to form a contact surface, a shoulder in said chamber at the end of said grooves engaged by the bent end of said terminal member to limit movement of said terminal member in one direction, said terminal member being formed with an angularly-extending offset portion intermediate its length forming a shoulder, said inner housing part being provided with a radial slot to receive said offset portion with the bottom of said slot engaging said shoulder and operable to hold said terminal member against movement in the other direction, and means for securing said housing parts in assembled relation.

References Cited in the file of this patent

UNITED STATES PATENTS

| | | |
|---|---|---|
| 2,572,335 | Hafke | Oct. 23, 1951 |
| 2,814,698 | Miller | Nov. 26, 1957 |
| 2,841,673 | Benander | July 1, 1958 |
| 2,899,511 | Fraser | Aug. 11, 1959 |
| 3,054,871 | Skay | Sept. 18, 1962 |
| 3,054,879 | Soreng | Sept. 18, 1962 |

UNITED STATES PATENT OFFICE
CERTIFICATE OF CORRECTION

Patent No. 3,134,004            May 19, 1964

Jasper Long

It is hereby certified that error appears in the above numbered patent requiring correction and that the said Letters Patent should read as corrected below.

Column 3, line 15, for "form" read -- from --; line 63, after "mem-" insert --ber 10 abutting the stops formed by ends 53 of ribs 54. --; same column 3, line 66, strike out "the ribs 47 with the shoulder portions 36 of the terminal".

Signed and sealed this 10th day of November 1964.

(SEAL)
Attest:

ERNEST W. SWIDER
Attesting Officer

EDWARD J. BRENNER
Commissioner of Patents